United States Patent
Kottapalli et al.

(10) Patent No.: US 12,079,329 B2
(45) Date of Patent: Sep. 3, 2024

(54) STRUCTURED DATA FLOW IDENTIFICATION FOR PROACTIVE ISSUE DETECTION

(71) Applicant: Dell Products L.P., Round Rock, TX (US)

(72) Inventors: Siva Rama Krishna Kottapalli, North Chelmsford, MA (US); Karthik Hubli, Northborough, MA (US); Bina Thakkar, Cary, NC (US)

(73) Assignee: DELL PRODUCTS L.P., Round Rock, TX (US)

( * ) Notice: Subject to any disclaimer, the term of this patent is extended or adjusted under 35 U.S.C. 154(b) by 291 days.

(21) Appl. No.: 17/585,512

(22) Filed: Jan. 26, 2022

(65) Prior Publication Data

US 2023/0237150 A1    Jul. 27, 2023

(51) Int. Cl.
  *G06F 21/00*    (2013.01)
  *G06F 21/55*    (2013.01)

(52) U.S. Cl.
  CPC ........ *G06F 21/55* (2013.01); *G06F 2221/034* (2013.01)

(58) Field of Classification Search
  None
  See application file for complete search history.

(56) References Cited

U.S. PATENT DOCUMENTS

| | | | | |
|---|---|---|---|---|
| 7,917,393 | B2* | 3/2011 | Valdes | H04L 63/1408 |
| | | | | 709/224 |
| 8,402,540 | B2* | 3/2013 | Kapoor | H04L 67/34 |
| | | | | 709/224 |
| 10,419,463 | B2* | 9/2019 | Muddu | G06F 3/0482 |
| 11,074,341 | B2* | 7/2021 | Monsonego | G06F 21/552 |
| 11,218,498 | B2* | 1/2022 | Hajimirsadeghi | G06N 3/02 |
| 11,637,858 | B2* | 4/2023 | Wojnowicz | H04L 63/20 |
| | | | | 726/23 |

(Continued)

OTHER PUBLICATIONS

Ren et al., Improving Out-of-Distribution Detection in Machine LearningModels, https://ai.googleblog.com/2019/12/improving-out-of-distribution-detection.html, Google AI Blog, 2019, 4 pgs.

*Primary Examiner* — Maung T Lwin
(74) *Attorney, Agent, or Firm* — Amin, Turocy & Watson, LLP

(57) ABSTRACT

The described technology is generally directed towards processing structured data corresponding to system information such as alerts, logs, events, health check data and the like, to identify stateful flows from the structured data. Identical flows are combined, similar flows, based on similarity scores obtained from stateful flows are combined, and incremental stateful flows are combined. Neural networks can be used to identify the similar flows and incremental flows. A distribution can be obtained based on counts of the different stateful flows that remain after combining the identical, similar and incremental stateful flows; a neural network that accounts for subtle differences can be used to provide a more accurate distribution than simple counts. Anomalous stateful flows can be identified from the distribution, with some action taken for an anomalous stateful flow, e.g., to send a notification or other output to a support engineer of the like for proactive issue detection.

20 Claims, 16 Drawing Sheets

(56) References Cited

U.S. PATENT DOCUMENTS

| | | | |
|---|---|---|---|
| 2019/0132346 A1* | 5/2019 | Christian | H04L 63/1425 |
| 2020/0285737 A1* | 9/2020 | Kraus | G06F 21/552 |
| 2021/0377282 A1* | 12/2021 | Wojnowicz | H04L 63/145 |
| 2022/0086179 A1* | 3/2022 | Levin | H04W 12/63 |
| 2023/0090132 A1* | 3/2023 | Babourine | G06F 21/31 |
| | | | 726/23 |

\* cited by examiner

436

| # | Id | Stateful Flow Template | Occurrences |
|---|---|---|---|
| 1 | 93c60fe5 | Base url for <*> is: <*> | 55134 |
| 2 | ae227c54 | REST client constructor host: <*> | 41238 |
| 3 | 53fbeb82 | $VAR1 = { | 41224 |
| 4 | f05b7dda | Retrieving the current provisioning state from the DB (1) | 27522 |
| 5 | 2d2ded44 | ABCD is enabled | 27522 |
| 6 | b0614dca | ABCD EF type is <*> | 27522 |
| 7 | 1fa6cabc | Check the request response for errors | 27518 |
| 8 | 0f9ddb72 | The eEF feature is ENABLED | 27512 |
| 9 | e0ab9e2a | Action completed successfully with: 200 | 27424 |
| 10 | 6ebbda97 | Integrated ABCD EF has been provisioned | 22148 |
| 11 | 5b9b8f14 | About to enter pre action eEF state. | 13806 |
| 12 | b353fa24 | Skip the pre action state check since it's not a integrated only action. | 13806 |
| 13 | d68ffaf9 | Creating ABCD EF REST request for ACTION_DOSOMETHING | 13806 |
| 14 | c282f7fa | Request: <*> | 13806 |
| ⋮ | | | |
| 25 | b4b0fe2f | Integrated ABCD EF has NOT been provisioned | 5374 |
| 26 | aa895334 | Centralized solution is enabled. Using values from the db: <*> | 3906 |
| 27 | 763d0867 | Error: Action {ACTION_DOSOMETHING} failed with: <*> Retries remaining: <*> | 94 |
| 28 | 143e9a35 | Error: Error performing action {ACTION_DOSOMETHING} for EF server <*> failed with: <*> | 90 |
| 29 | 9f5df8da | /XYZ/JKL/log/eEF/ef_abcd_QRS.log log wrapping completed | 71 |
| 30 | 4b6902ce | /XYZ/JKL/log/eEF/ ef_abcd _QRS.log reached 1MB size, beginning to wrap log | 61 |
| 31 | a7bbe74e | Error: Action {ACTION_DOSOMETHING} failed with: 1. reties exhausted. | 4 |

FIG. 4

```
1  Wed Mar 24 22:43:17 2021 ABCD_EF.pl:14727: /XYA/KEM/log/eEF/ef_abcd_QRS.log log wrapping completed
2  Wed Mar 24 22:43:18 2021 ABCD_EF.pl:14727: Eef services are available
3  Wed Mar 24 22:43:18 2021 ABCD_EF.pl:14727: Retrieving the current provisioning state frost the DB (1)
4  Wed Mar 24 22:43:18 2021 ABCD_EF.pl:14727: REST client constructor host: https://localhost:1234/
5  Wed Mar 24 22:43:18 2021 ABCD_EF.pl:14727: Base url for ACTION GET SOMEPROV STATE is:api/types/abcdTestX/instances?cols.abcdConfig
6  Wed Mar 24 22:43:18 2021 ABCD_EF.pl:14727: ABCD is enabled
7  Wed Mar 24 22:43:18 2021 ABCD_EF.pl:14727: ABCD EF type is Integrated
8  Wed Mar 24 22:43:18 2021 ABCD_EF.pl:14727: Integrated ABCD EF has been provisioned
9  Wed Mar 24 22:43:18 2021 ABCD_EF.pl:14727: Inspecting incoming IP and port
10 Wed Mar 24 22:43:18 2021 ABCD_EF.pl:14727: REST client constructor host: https://128.002.002.003:2345/
11 Wed Mar 24 22:43:18 2021 ABCD_EF.pl:14727: WARNING: Defaulting to a QRS fileType of: STORE
12 Wed Mar 24 22:43:18 2021 ABCD_EF.pl:14727: About to enter pre action eEF state.
13 Wed Mar 24 22:43:18 2021 ABCD_EF.pl:14727: Skip the pre action state check since it's not an integrated only action.
   •••
20 Wed Mar 24 22:43:22 2021 ABCD_EF.pl:14727: The eEF feature is ENABLED
21 Wed Mar 24 22:43:22 2021 ABCD_EF.pl:14727: Retrieving the current provisioning state from the DB (1)
22 Wed Mar 24 22:43:22 2021 ABCD_EF.pl:14727: REST client constructor host: https:localhost:1234
23 Wed Mar 24 22:43:22 2021 ABCD_EF.pl:14727: Base url for ACTION_GET_SOMEPROV_STATE is: api/types/abcdTestXYZ/instances?cols.abc
24 Wed Mar 24 22:43:22 2021 ABCD_EF.pl:14727: ABCD is enabled
25 Wed Mar 24 22:43:22 2021 ABCD_EF.pl:14727: ABCD EF type is Integrated
26 Wed Mar 24 22:43:22 2021 ABCD_EF.pl:14727: Integrated ABCD EF has been provisioned
27 Wed Mar 24 22:43:22 2021 ABCD_EF.pl:14727: About to enter post action eEF state since eEF feature is ENABLED and Integrated EF is provision
28 Wed Mar 24 22:43:22 2021 ABCD_EF.pl:14727: Skip post action eEF state transition since it's not specified.
29 Wed Mar 24 22:43:22 2021 ABCD_EF.pl:14727: Check the request response for errors
3e Wed Mar 24 22:43:22 2021 ABCD_EF.pl:14727: $VAR1 = {
31 Wed Mar 24 22:43:22 2021 ABCD_EF.pl:14727: Action completed successfully with: 200
32 Wed Mar 24 22:43:22 2021 ABCD_EF.pl:14727: Check the request response for errors
33 Wed Mar 24 22:43:22 2021 ABCD_EF.pl:14727: $VAR1 = {
34 Wed Mar 24 22:43:22 2021 ABCD_EF.pl:14727: Action completed successfully with: 200
35 Wed Mar 24 22:47:07 2021 ABCD_EF.pl:32582: ========= Enter ABCD_EF.pi 1.7.00000000000 ==========
```

FIG. 5

| Time Stamp | Stateful Flow Message | Stateful Flow Message ID | Parameters |
|---|---|---|---|
| T1 | Flow Template 1 | 9f5df8da | [a, b] |
| T2 | Flow Template 2 | f8a7b436 | [c] |
| T3 | Flow Template 3 | 6ebbda97 | [d, e, f] |
| T4 | Flow Template 4 | b353fa24 | [g, h] |
| T5 | Flow Template 5 | d68ffaf9 | [i] |
| T6 | Flow Template 1 | 9f5df8da | [j, k] |
| T7 | Flow Template 2 | f8a7b436 | [l] |
| T8 | Flow Template 3 | 6ebbda97 | [m, n, o] |
| T9 | Flow Template 11 | 4b6902ce | [z] |
| T10 | Flow Template 5 | d68ffaf9 | [i] |

880

*from FIG. 7*

FIG. 8

STRUCTURED DATA FLOW IDENTIFICATION FOR PROACTIVE ISSUE DETECTION

BACKGROUND

Systems, including storage systems comprising storage devices and servers, generate a wide variety of data such as alerts, health checks, logs and the like from different components and services. The various data contains many significant details regarding the runtime information of the components and services that occur while operating the systems. Typically, such data is in the form of structured text data.

System-generated data frequently changes with the release of new versions of software, making analysis of structured data a challenging problem. This also makes it difficult for humans to analyze different stateful flows across large numbers of systems. The sheer volume of such data makes it extremely time-consuming for support team members to identify problems, as well as making the identification of issues error prone, and thus, not practicable or possible by any conventional means.

BRIEF DESCRIPTION OF THE DRAWINGS

The technology described herein is illustrated by way of example and not limited in the accompanying figures in which like reference numerals indicate similar elements and in which:

FIG. 4 is a representation of a data structure that summarizes a distribution of unique states identified by flow creation, in accordance with various aspects and implementations of the subject disclosure.

FIG. 5 is a representation of a log pattern of structured data to be processed, in accordance with various aspects and implementations of the subject disclosure.

FIGS. 7 and 8 show example components and data structures that produce templates for flows deemed unique, in accordance with various aspects and implementations of the subject disclosure.

DETAILED DESCRIPTION

Various aspects of the technology described herein are generally directed towards processing structured (including semi-structured) data such as text data into stateful flows, where a flow is a stateful sequence of message(s). The flows are then processed to combine similar flows, combine incremental (e.g., related) flows, and to obtain a flow distribution. Anomalous (abnormal) flows can be found via the distribution, with some action taken to indicate an Anomalous flow, such as to send a notification to a support engineer. In this way, support engineers do not have to examine extremely large datasets to find unknown or new problems or issues. This can be used for troubleshooting as well as proactive issue mitigation before an issue adversely impacts a system, and can be helpful in identifying vulnerabilities that can be exploited to undermine the integrity and security of the systems, e.g., by analyzing flows from a security perspective.

It should be understood that any of the examples herein are non-limiting. For instance, some of the examples are based on neural networks and a likelihood ratios for out of distribution detection procedure (e.g., https://ai.googleblog-.com/2019/12/improving-out-of-distribution-detection-.html), however other artificial intelligence (AI) and/or machine learning (ML) approaches can be used. Thus, any of the embodiments, aspects, concepts, structures, functionalities or examples described herein are non-limiting, and the technology may be used in various ways that provide benefits and advantages in computing and data storage in general.

Reference throughout this specification to "one embodiment," "an embodiment," "one implementation," "an implementation," etc. means that a particular feature, structure, or characteristic described in connection with the embodiment/ implementation is included in at least one embodiment/ implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
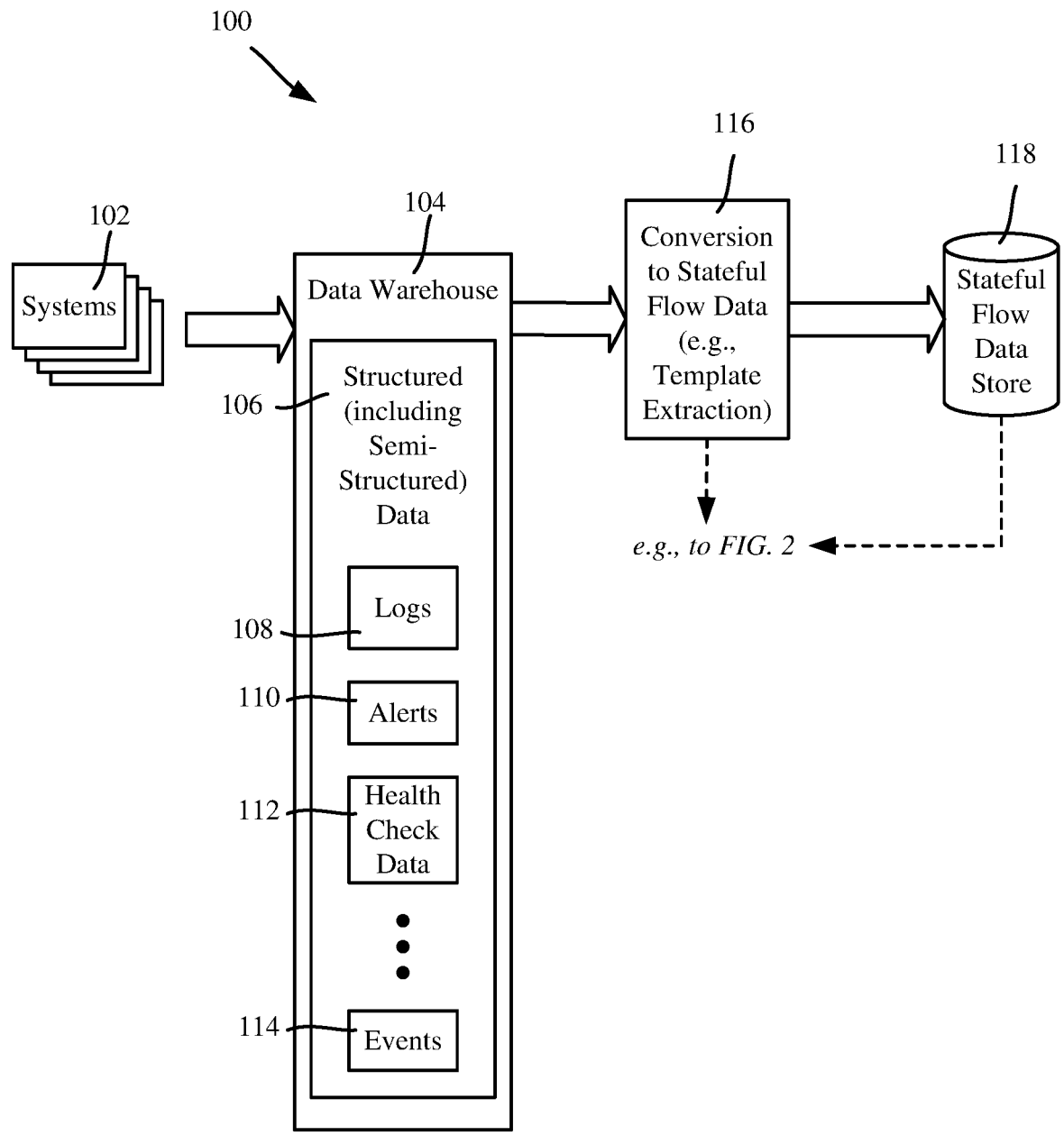
FIG. 1 is a block diagram representation of example components and data-related operations for generating stateful flows from structured data, in accordance with various aspects and implementations of the subject disclosure.

FIG. 1 shows an overall data handling system 100 in which various systems 102, such as servers, switches, storage systems and the like, output structured (including semi-structured) data to a data warehouse 104 or other suitable data store. Examples of such structured data 106 include, but are not limited to logs 108, alerts 110, device health data 112, events 114 and so on, typically in human-readable text form. A typical amount of data to be processed via the technology described herein can be on the order of tens of thousands or hundreds of thousands of messages per each of the various systems 102, although an even larger amount can be collected depending on how often the data is processed as described herein. Note that the technology described herein facilitates the generalization of flows across multiple systems, such as under the same product category.

As described herein, conversion logic 116 extracts stateful flows from the structured data 106; the stateful flows can be saved to a data store 118 for subsequent processing, analysis and so on, although further processing as described herein (FIG. 2) can occur more directly, e.g., as the stateful flows are extracted.

Figure 2:
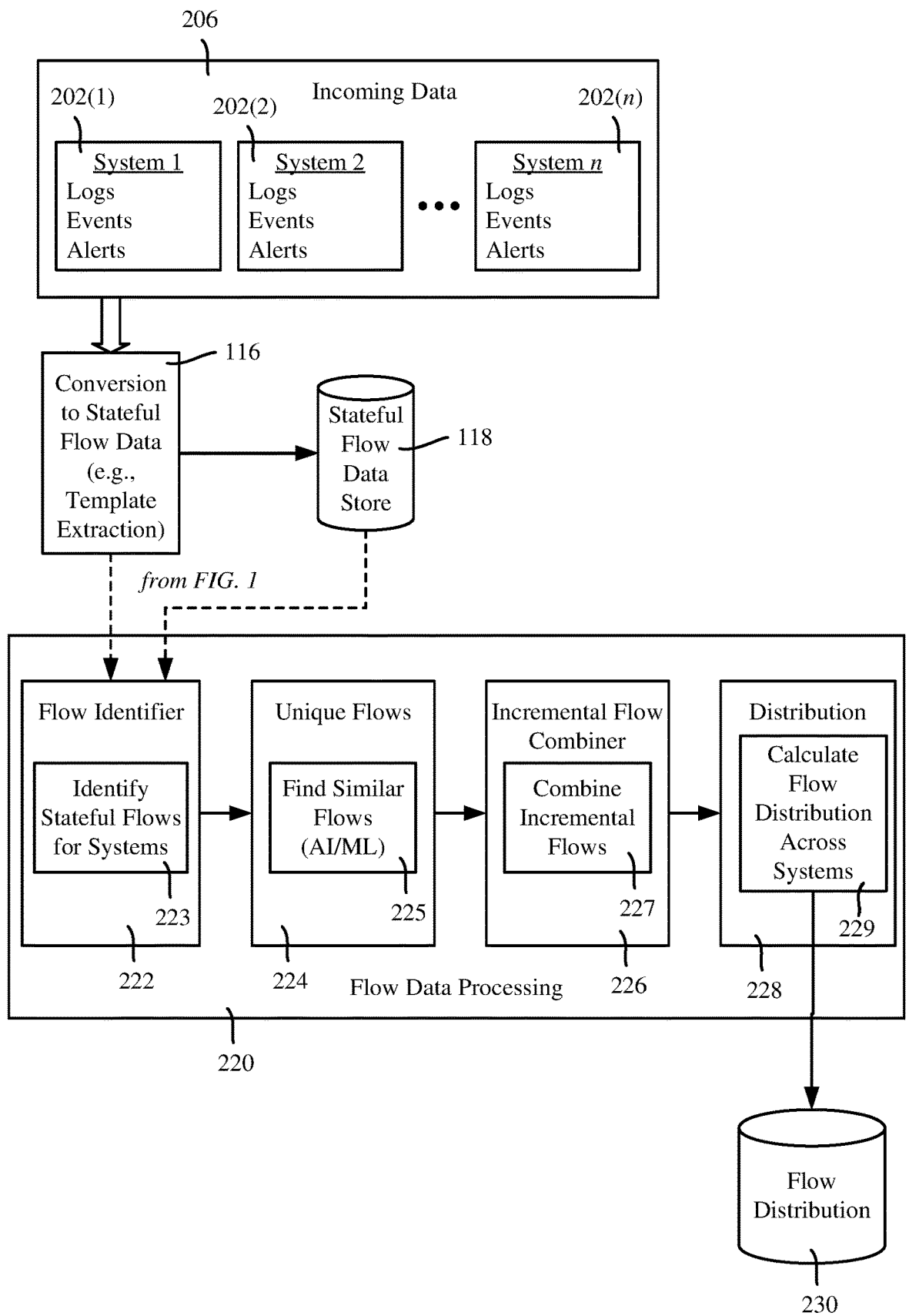
FIG. 2 is a block diagram representation of incoming structured data being processed by example components to generate stateful flows, in accordance with various aspects and implementations of the subject disclosure.

FIG. 2 shows an example of flow data processing (block 220) based on incoming data received from (and optionally stored, block 118) systems 202(1)-202(n) and converted to stateful flow data (block 116). Stateful flows are identified (blocks 222 and 223) to obtain unique flows (block 224), for example generated using a tree-based parser. Note that text data in its raw form cannot be easily analyzed with tokens such as dates, file paths, IP addresses and the like which change very frequently. Therefore, relevant information from the text data is extracted in an automated process in the form of flows, with the flows' extracted information processed to gain insights into the systems. Examples of extraction are described with reference to FIGS. 5-9.

In one implementation, the identification process (block 223) converts the text data's extracted information into unique hash value-based flows (where "unique" refers to unique for this processing session). Flows that are identical have the same hash values, and can be combined. Note that count data of combined flows can be maintained so that, for example, a frequently reoccurring flow is not considered rare because of the many hash-based combinations.

To help determine the unique flows 224, similar flows are combined (block 225) based on a similarity score as described herein, e.g., via AI/ML. For example, different systems can output the same general types of messages, which when converted to flows can be combined. Again, a count can be maintained so that a frequent type of flow is not considered infrequent because of combination.

Further, certain types of flows are incremental, in that they are basically the same message repeated, e.g., {message X, retry 1}, {message X, retry 2}, {message X, error}. An incremental flow combiner as described herein detects and combines such incremental flows; (a count can be maintained as well).

Figure 3:
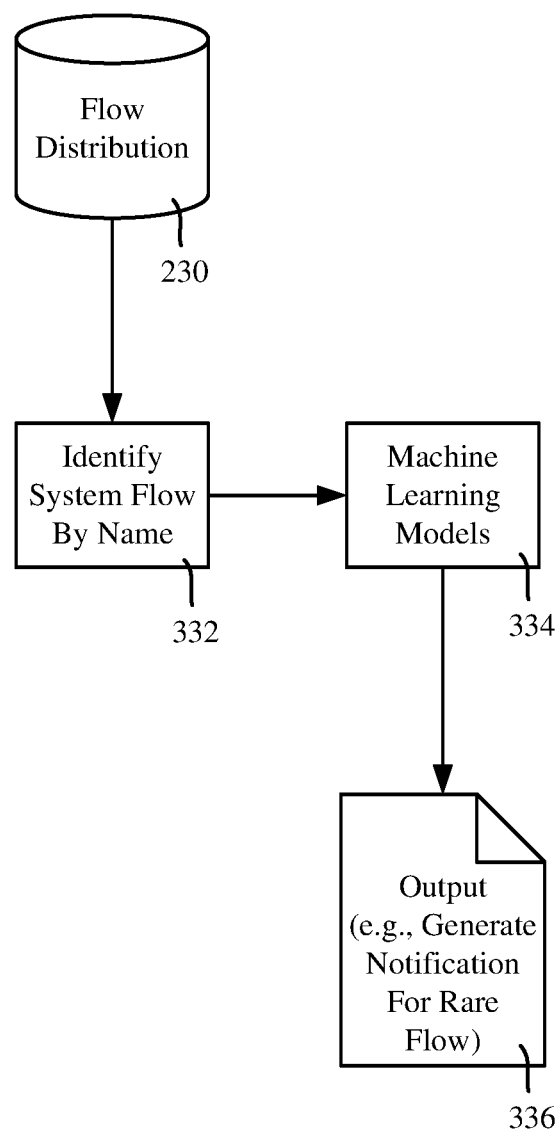
FIG. 3 is a representation of example components that facilitate a flow distribution for outputting information for rarely occurring flows, in accordance with various aspects and implementations of the subject disclosure.

The result is a number of non-incremental flows that are unique to the processing session. These flows can be processed (blocks 228 and 229) for output as a flow distribution 230. Such system flows can be identified by their names, e.g., their unique hash values, as represented in FIG. 3 via block 332.

Note that while simple distributions are straightforward to calculate, even after finding similar flows there can be small differentiating factors (e.g., in the text semantics) that can help identify abnormal flows from normal flows. Machine learning models 334 can perform such as task. More particularly, in one implementation, such flows are identified using a likelihood ratios for out of distribution detection procedure, which in general removes the effect of background.

Once an anomalous flow is detected, some output/action is taken with respect to the rare flow (or flows). For example, a notification can be generated, a printout and/or visualization of the distribution can be produced that emphasizes and identifies the rare flow, and so on. FIG. 4 shows an example of a number of unique states identified by the technology described herein, where the counts represent occurrences of each unique state. In FIG. 4 the log event template 436 file shows what the frequency (occurrences) count looks like after processing close to 500 thousand log messages in which the technology described herein identified 31 unique log event templates. As can be seen, there are some event templates in the logs which occur relatively rarely, which can help support engineers easily identify potential or actual issues.

Figure 6:
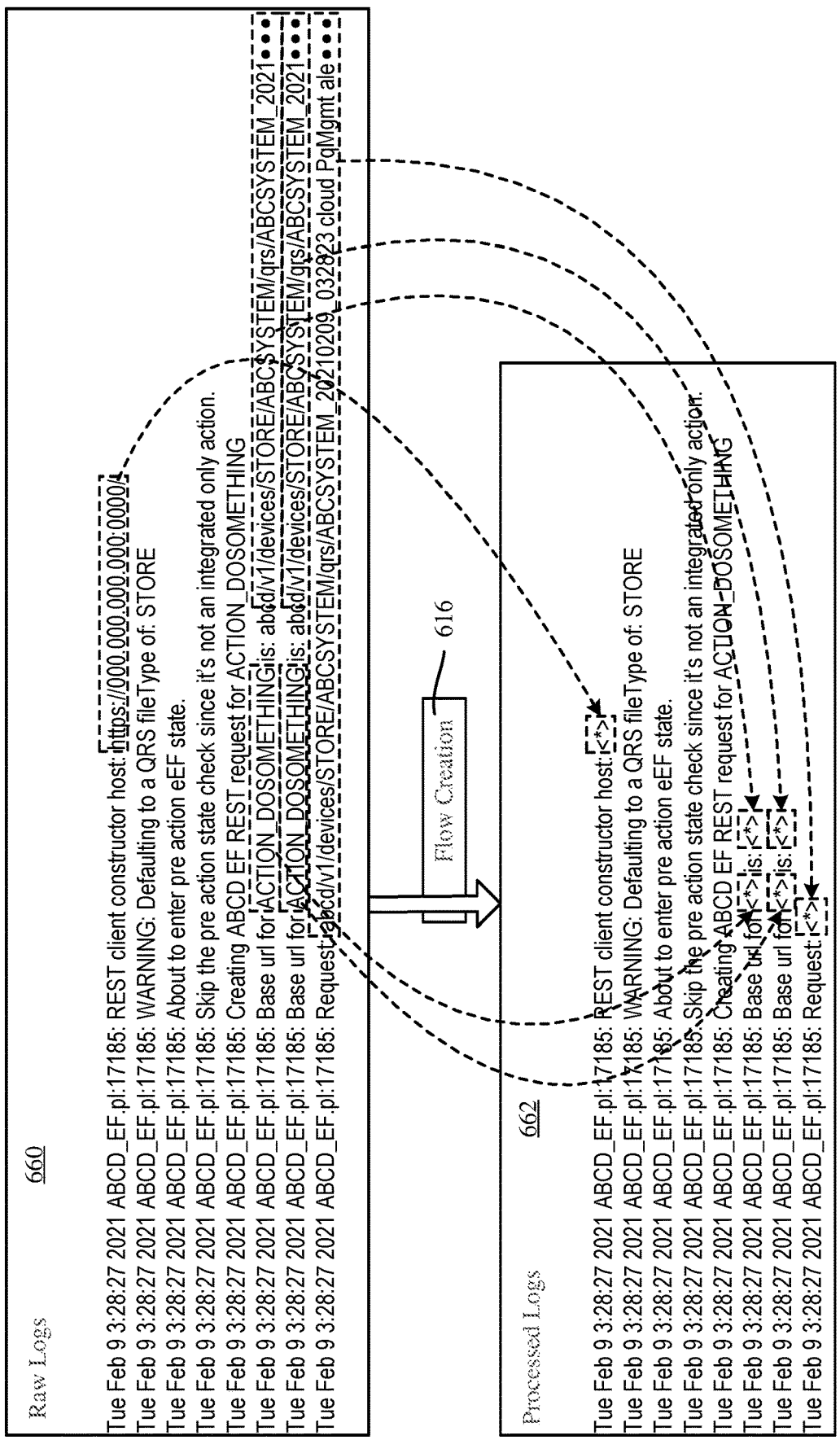
FIG. 6 is an example of part of flow creation, in accordance with various aspects and implementations of the subject disclosure

Turning to an example of flow creation, FIG. 5 shows a sample log pattern of raw logs, with FIG. 6 showing a smaller portion 660. As can be seen in FIGS. 5 and 6, some of the log data contains dates, file paths, tokens, IP addresses and the like that change frequently, yet the underlying message is generally the same type of message. As such, flow creation 616 operates to detect such patterns and convert them to generic symbols (e.g., "<*>") in a template representative of the variable patterns. Following such conversion, identical and similar messages in the processed logs 662 can be combined as described herein.

Figure 7:
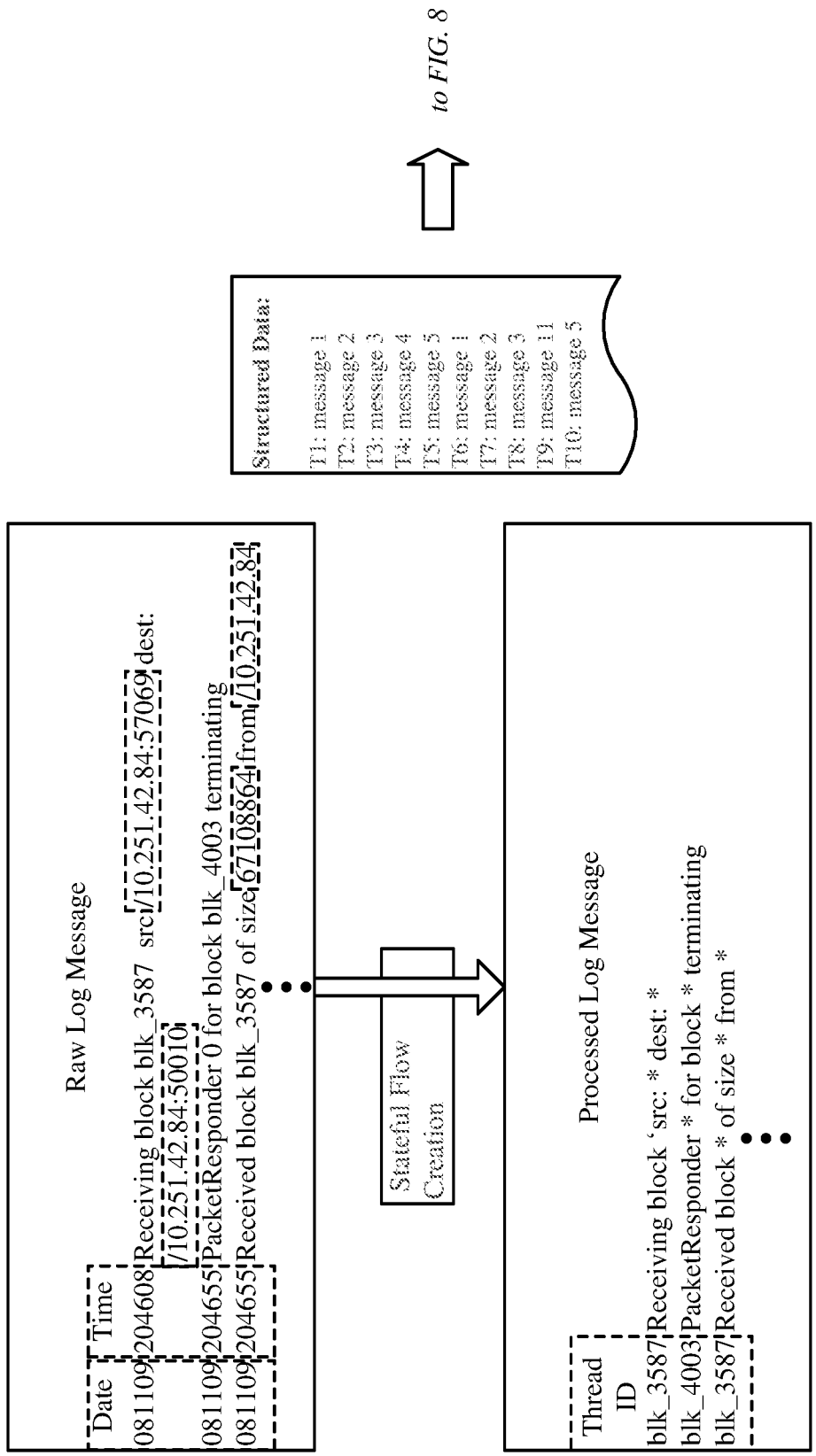

FIGS. 7 and 8 show an example of converting raw log messages 770 to processed log messages 780 and fitting those processed log messages 772 to templates representing the stateful flow messages. In FIG. 7, the dates and times can be maintained, but need not be used for determining distributions. Again, the variable changing tokens (the values in dashed boxes to the right of the times are converted to an asterisk "*" (or the like) as part of the conversion to the processed log message 772. Further, the thread identifiers (IDs) are identified.

As shown in FIG. 8 in the table 880 in this example, the variables of primary interest are shown in the dashed box, namely the stateful flow message (templates) and the stateful flow message IDs (the hash values). As can be seen, the hash values that are identical are mapped to the same template, e.g., flow template 1 (at time stamps T1 and T6) corresponds to hash value 9f5df8da.

Figure 9:
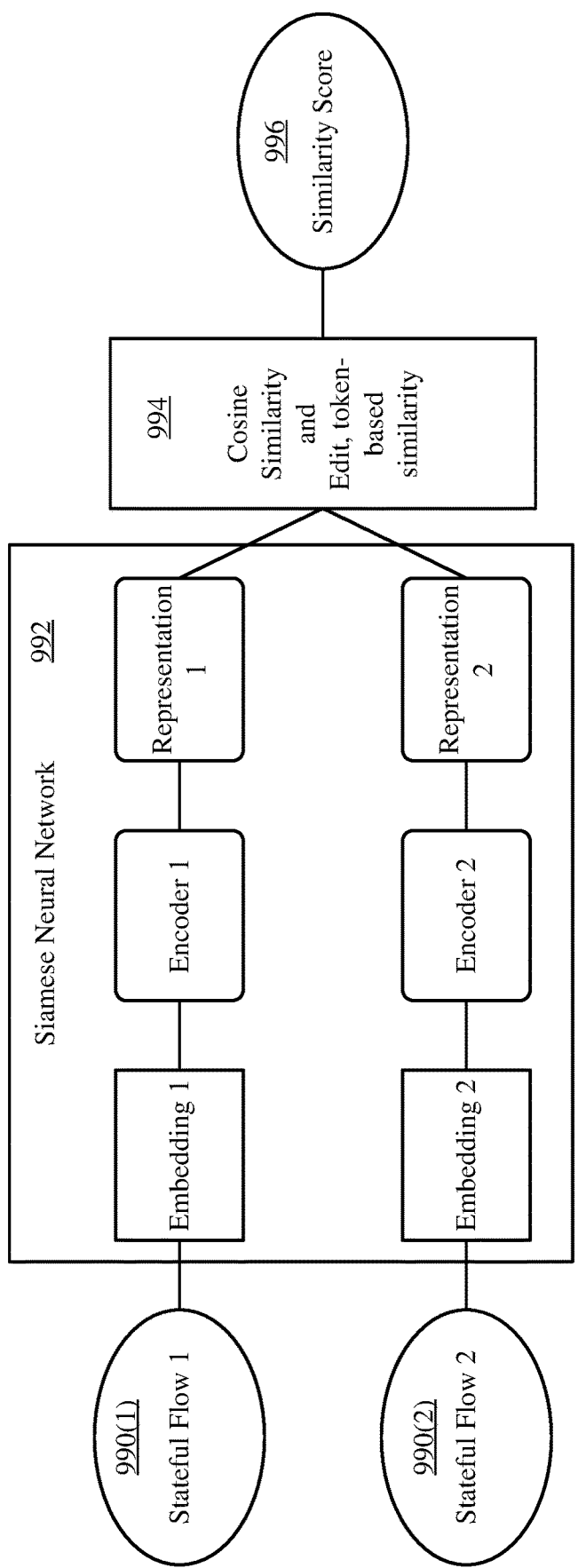
FIG. 9 is a representation of determining a similarity score for a pair of stateful flows, in accordance with various aspects and implementations of the subject disclosure.

In text data, generated flows do not exactly match every time across multiple systems, and thus there are often subtle differences in the flows. As represented in FIG. 9, such subtle differences (e.g., among pairs of flows (990(1) and 990(2)) can be identified in a straightforward manner using a combination of well-known techniques, including a Siamese Neural Network 992 in conjunction with cosine similarity and edit-based and token-based similarity algorithms 994. The output is a similarity score 996, which can be evaluated against a defined (e.g., user configurable) similarity threshold or the like to determine whether flows are sufficiently similar so as to combine them.

Further, incremental flows can be combined, as described with reference to block 226 of FIG. 2. In one implementation, identifying and combining incremental flows is performed using a two-dimensional Convolutional Neural Network (CNN) trained with suitable data in a known way; (note that this is instead of commonly used Recurrent Neural Networks (RNNs) for sequence-based data (e.g., Long Short-Term Memory or Gated Recurrent Units (GRUs))).

Figure 10:
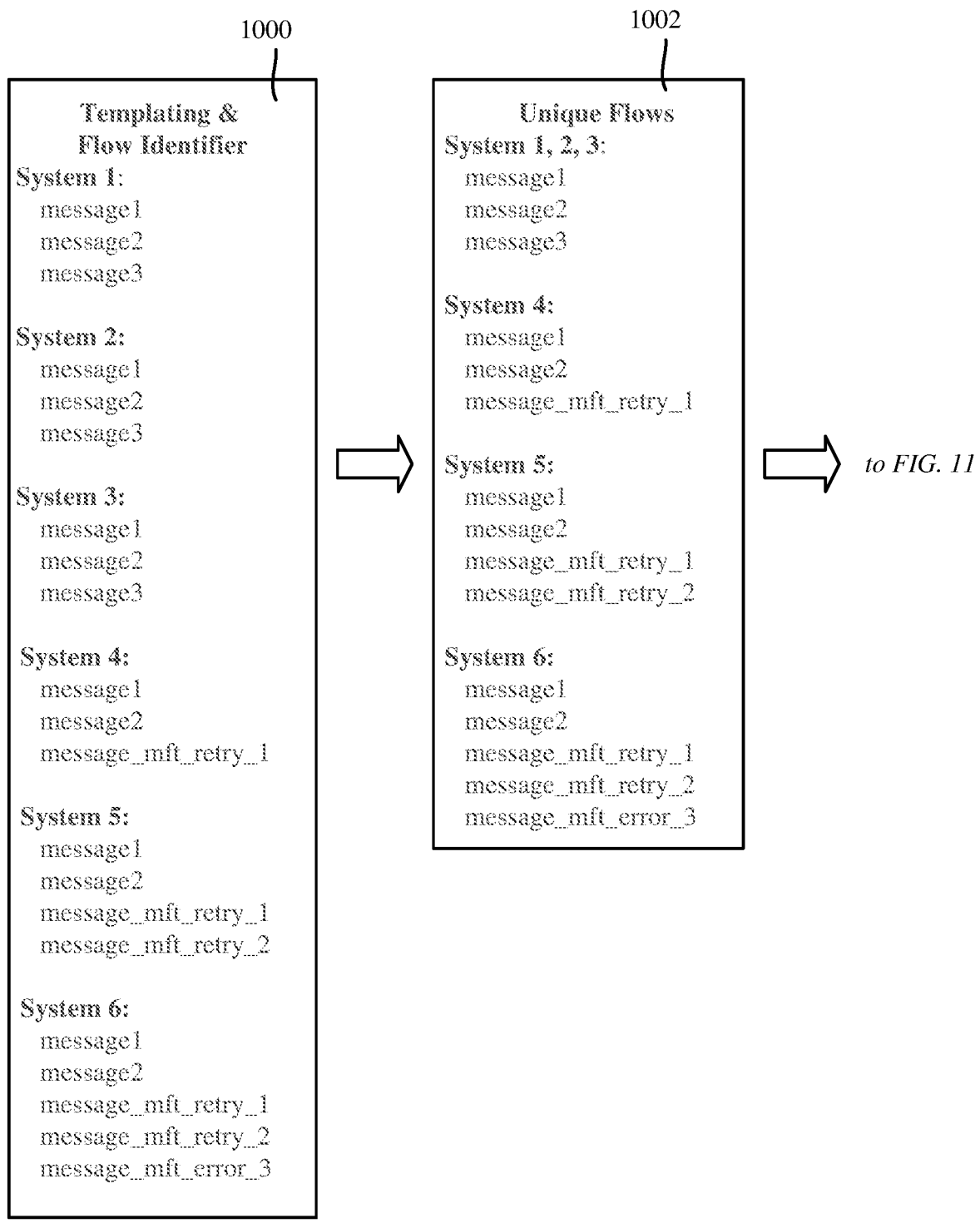
FIGS. 10 and 11 show an example of producing a flow distribution by determining unique flows and combining incremental flows, in accordance with various aspects and implementations of the subject disclosure.
Figure 11:
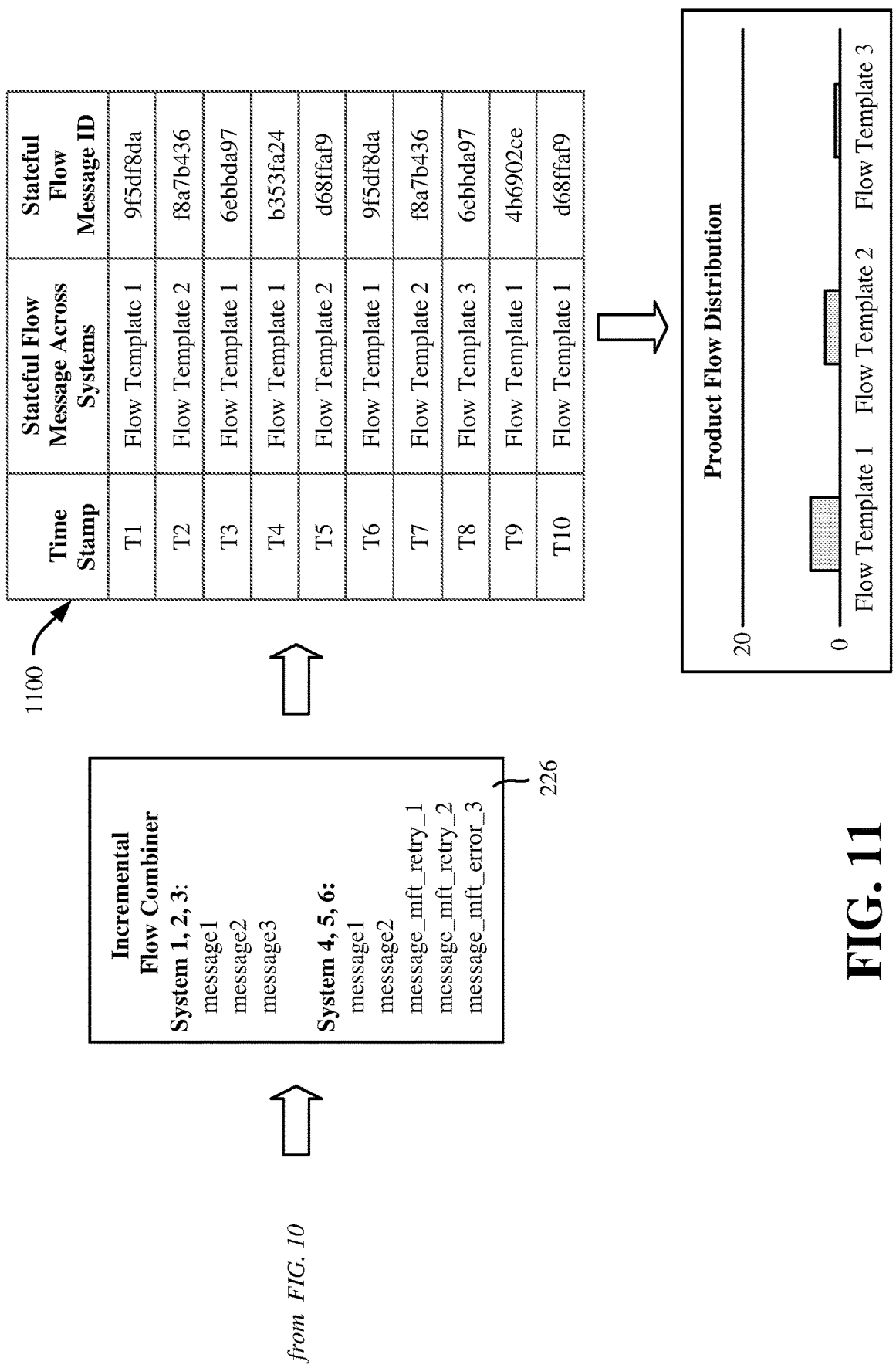

By way of a simplified example of incremental flow combination, FIGS. 10 and 11 show initial messages 1000 from systems 1-6. Following conversion, it is seen that the unique flows 1002 for the systems 1, 2 and 3 are the same, namely message1, message2 and message3. However, the unique flows 1002 for the systems 4, 5 and 6 contain incremental flows, namely retry messages and an error message.

As shown in FIG. 11 via block 228, the incremental flow combiner 226 recognizes the incremental flows, and combines them. The flow distribution is determined after this, e.g., using the aforementioned Likelihood Ratios for Out Of Distribution Detection procedure. In this simplified example, although there can be subtle differences (e.g., with different hash values) and/or incremental flows, only three flow templates are needed to represent these messages, six for flow template 1, three for flow template 2, and 1 for flow template 3. In a larger example as in the distribution of FIG. 4, there are more flow templates, ranging in occurrences from 55134 to 4. Depending on an anomalous state flow criterion, e.g., below a threshold percentage of the total, one or more anomalous state flows are identified.

Figure 12:
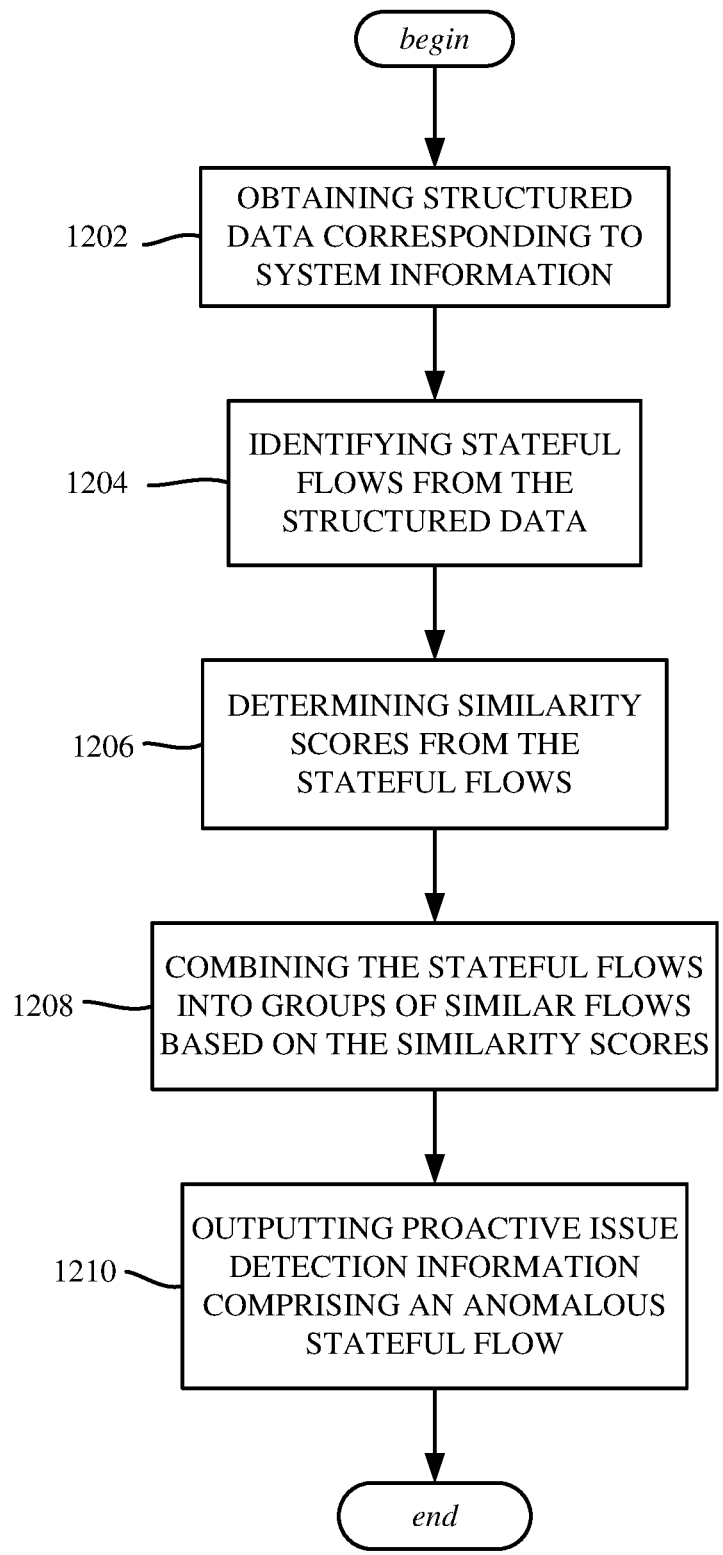
FIG. 12 is a flow diagram showing example operations related to outputting proactive issue detection information based on stateful flows, in accordance with various aspects and implementations of the subject disclosure.

One or more aspects can be embodied in a system, such as represented in FIG. 12, and for example can comprise a memory that stores computer executable components and/or operations, and a processor that executes computer executable components and/or operations stored in the memory. Example operations can comprise operation 1202, which represents obtaining structured data corresponding to system information. Operation 1204 represents identifying stateful flows from the structured data. Operation 1206 represents determining similarity scores from the stateful flows. Operation 1208 represents combining the stateful flows into groups of similar flows based on the similarity scores. Operation 1210 represents outputting proactive issue detection information comprising an anomalous stateful flow.

The structured data can include text data. The structured data can include component data and service data comprising at least one of: log data, alert data, health check data or event data.

Identifying the stateful flows from the structured data can include determining an incremental flow comprising a number of stateful flows and merging the incremental flow into a lesser number of stateful flows.

Determining the incremental flow and the merging the incremental flow can be performed by a two-dimensional convolutional neural network.

Identifying the stateful flows from the structured data can include extracting parameter data from the structured data to obtain reduced datasets, hashing respective reduced datasets to obtain respective hash values, and for respective reduced datasets having respective hash values, combining the reduced datasets having identical hash values into a respective single dataset.

The proactive issue detection information can include a distribution, and the anomalous stateful flow can correspond to a low distribution based on a known distribution.

Determining the similarity scores from the stateful flows can include inputting respective pairs of the stateful flows into a Siamese neural network to obtain a respective similarity score for each respective pair.

Determining the similarity scores can include performing at least one of: a cosine similarity procedure, an edit-based similarity procedure, or a token-based similarity procedure.

Outputting the proactive issue detection information can include identifying the anomalous stateful flow via a likelihood ratios for out of distribution detection procedure.

Figure 13:
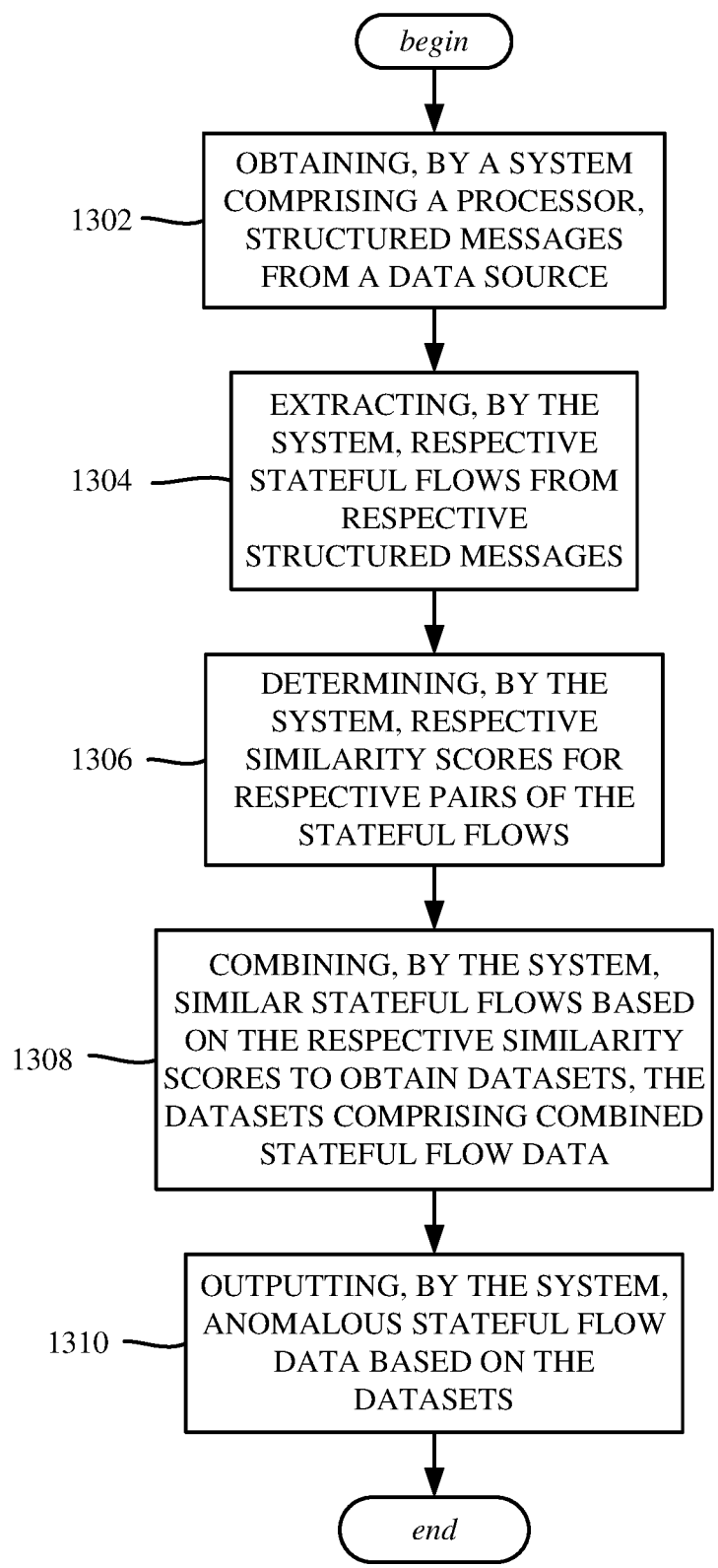
FIG. 13 is a flow diagram showing example operations related to combining similar stateful flows to obtain datasets of combined stateful flow data to output anomalous stateful flow data, in accordance with various aspects and implementations of the subject disclosure.

One or more example aspects, such as corresponding to example operations of a method, are represented in FIG. 13. Operation 1302 represents obtaining, by a system comprising a processor, structured messages from a data source. Operation 1304 represents extracting, by the system, respective stateful flows from respective structured messages. Operation 1306 represents determining, by the system, respective similarity scores for respective pairs of the stateful flows. Operation 1308 represents combining, by the system, similar stateful flows based on the respective similarity scores to obtain datasets, the datasets comprising combined stateful flow data. Operation 1310 represents outputting, by the system, anomalous stateful flow data based on the datasets.

Operations can include reducing, by the system, identical stateful flows by eliminating at least one of the identical stateful flows.

Operations can include detecting, by the system, related incremental stateful flow, and merging, by the system, the related incremental stateful flows into a single stateful flow.

Outputting the anomalous flow data can include outputting a distribution representing counts of the datasets.

Operations can include processing, by the system, the datasets via a likelihood ratios for out of distribution detection procedure to obtain the anomalous stateful flow data.

Operations can include taking action, by the system, to indicate detection of an anomalous stateful flow.

Figure 14:
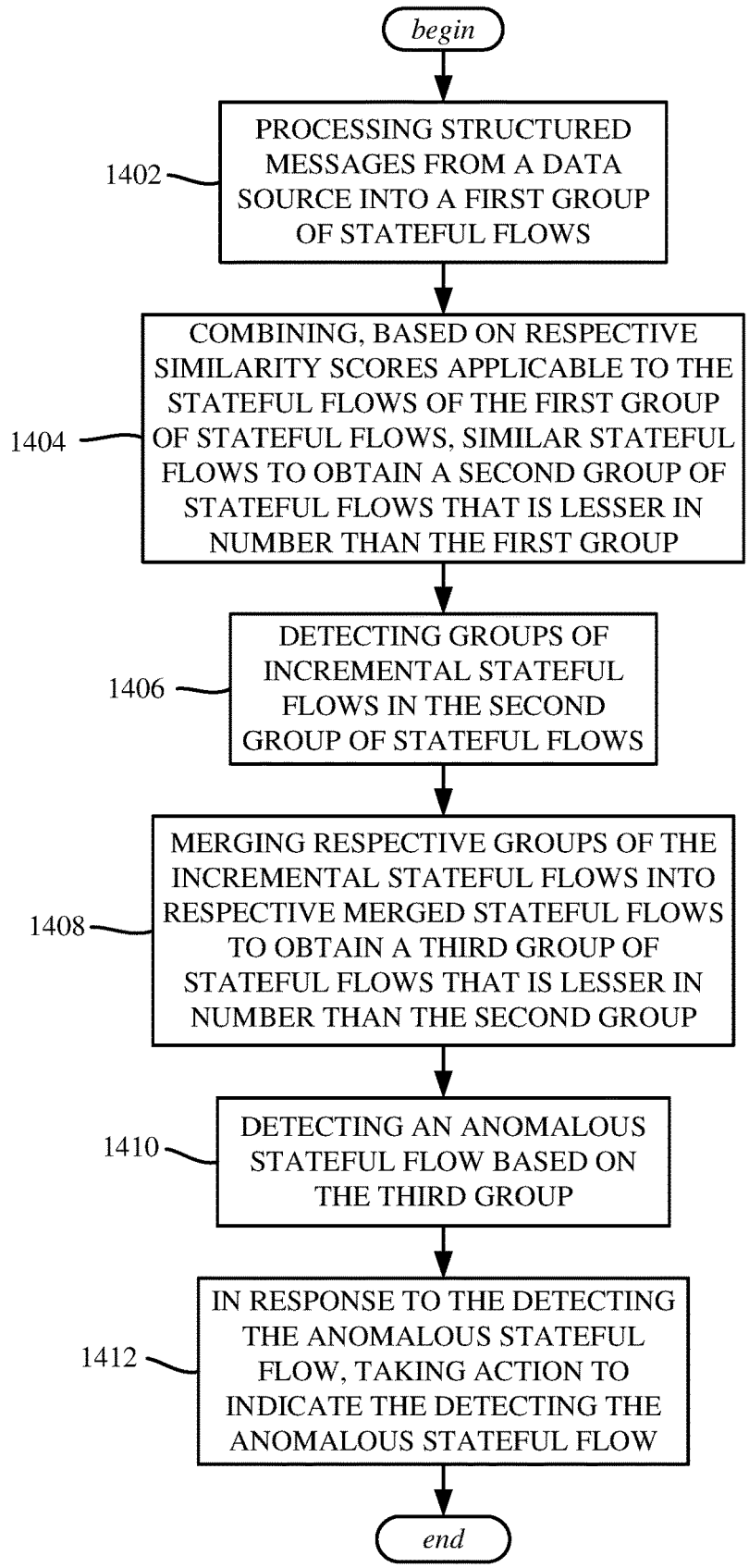
FIG. 14 is a flow diagram showing example operations related to detecting an anomalous stateful flow, in accordance with various aspects and implementations of the subject disclosure.

FIG. 14 summarizes various example operations, e.g., corresponding to a machine-readable medium, comprising executable instructions that, when executed by a processor, facilitate performance of operations. Operation 1402 represents processing structured messages from a data source into a first group of stateful flows. Operation 1404 represents combining, based on respective similarity scores applicable to the stateful flows of the first group of stateful flows, similar stateful flows to obtain a second group of stateful flows that is lesser in number than the first group. Operation 1406 represents detecting groups of incremental stateful flows in the second group of stateful flows. Operation 1408 represents merging respective groups of the incremental stateful flows into respective merged stateful flows to obtain a third group of stateful flows that is lesser in number than the second group. Operation 1410 represents detecting an anomalous stateful flow based on the third group, e.g., via a distribution. Operation 1412 represents, in response to the detecting the anomalous stateful flow, taking action to indicate the detecting the anomalous stateful flow.

Processing the structured messages into the first group of stateful flows can include processing raw structured data into structured messages, which can include modifying variable parameter data from the raw structured messages to provide processed structured messages, hashing the processed structured messages to detect identical processed structured messages, and combining the identical processed structured messages into the first group of stateful flows.

Taking the action to indicate the detecting the anomalous stateful flow can include outputting a data structure that comprises a distribution of the third group of stateful flows.

Taking the action to indicate the detecting the anomalous stateful flow can include outputting a notification.

As can be seen, for a system or group of systems, the technology described herein generates stateful flows, which can be based on historical data. Note that via known/historical data, the technology allows for flexibility to change stateful flow lengths based on the accuracy and other evaluation metrics. The technology leverages multiple structured data sources and combines them to find potential issues and adopts to changing data sources; moreover, the solution is self-learning.

In addition to identifying the flows, the resulting flow distribution can be evaluated, including against a known distribution (and/or percentage), and can produce useful output for taking action, e.g., to generate a notification for a flow with a low distribution count to highlight unusual stateful flows by understanding differences between common and uncommon stateful workflows. In this way, support engineers can quickly locate and analyze structured data sources to find the root cause of a problem. This facilitates proactive issue mitigation, as well as identifying integrity and security vulnerabilities.

Figure 15:
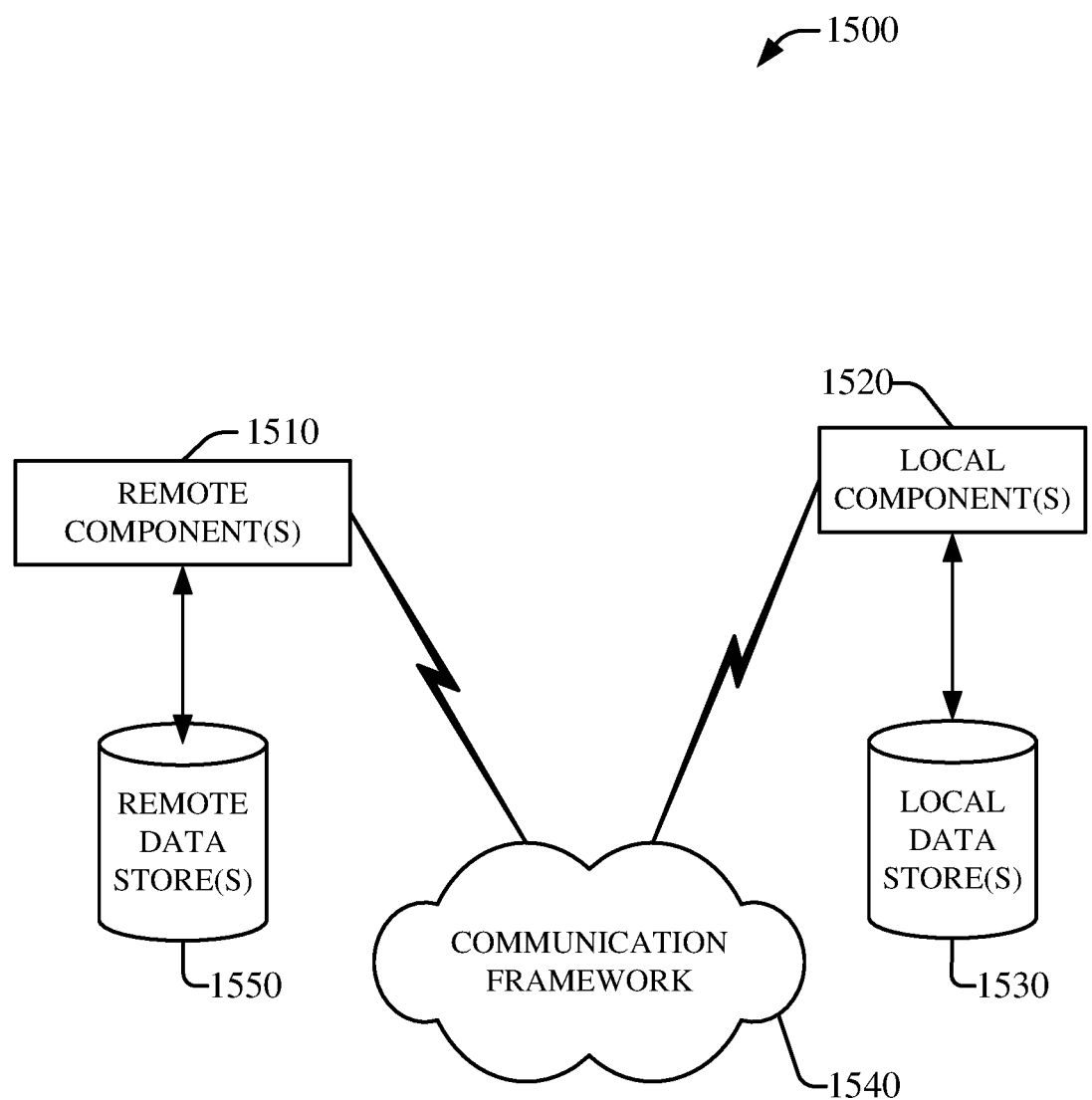
FIG. 15 is a block diagram representing an example computing environment into which aspects of the subject matter described herein may be incorporated.

FIG. 15 is a schematic block diagram of a computing environment 1500 with which the disclosed subject matter can interact. The system 1500 comprises one or more remote component(s) 1510. The remote component(s) 1510 can be hardware and/or software (e.g., threads, processes, computing devices). In some embodiments, remote component(s) 1510 can be a distributed computer system, connected to a local automatic scaling component and/or programs that use the resources of a distributed computer system, via communication framework 1540. Communication framework 1540 can comprise wired network devices, wireless network devices, mobile devices, wearable devices, radio access network devices, gateway devices, femtocell devices, servers, etc.

The system 1500 also comprises one or more local component(s) 1520. The local component(s) 1520 can be hardware and/or software (e.g., threads, processes, computing devices). In some embodiments, local component(s) 1520 can comprise an automatic scaling component and/or programs that communicate/use the remote resources 1510 and 1520, etc., connected to a remotely located distributed computing system via communication framework 1540.

One possible communication between a remote component(s) 1510 and a local component(s) 1520 can be in the form of a data packet adapted to be transmitted between two or more computer processes. Another possible communication between a remote component(s) 1510 and a local component(s) 1520 can be in the form of circuit-switched data adapted to be transmitted between two or more computer processes in radio time slots. The system 1500 comprises a communication framework 1540 that can be employed to facilitate communications between the remote component(s) 1510 and the local component(s) 1520, and can comprise an air interface, e.g., Uu interface of a UMTS network, via a long-term evolution (LTE) network, etc. Remote component(s) 1510 can be operably connected to one or more remote data store(s) 1550, such as a hard drive, solid state drive, SIM card, device memory, etc., that can be employed to store information on the remote component(s) 1510 side of communication framework 1540. Similarly, local component(s) 1520 can be operably connected to one or more local data store(s) 1530, that can be employed to store information on the local component(s) 1520 side of communication framework 1540.

Figure 16:
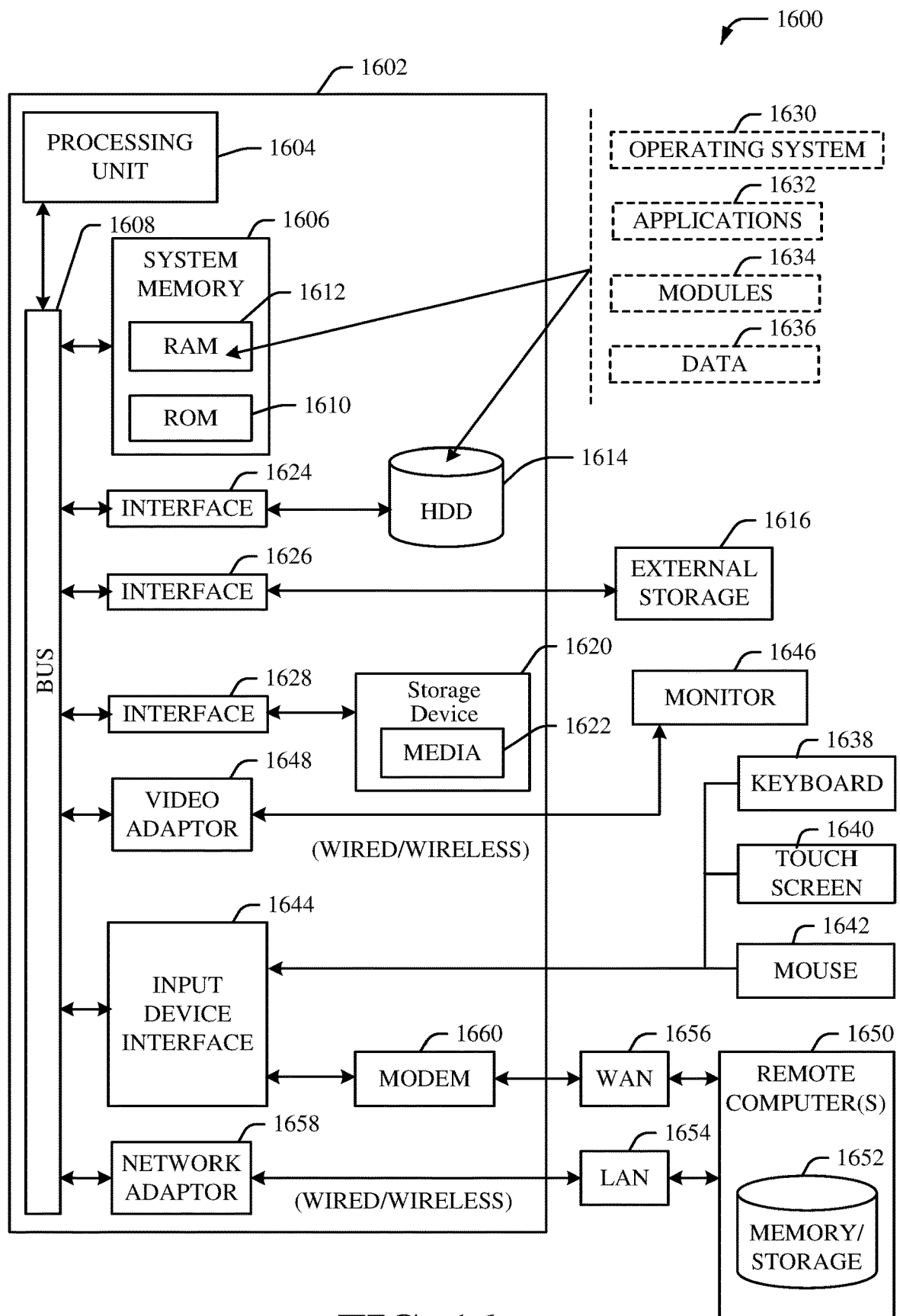
FIG. 16 depicts an example schematic block diagram of a computing environment with which the disclosed subject matter can interact/be implemented at least in part, in accordance with various aspects and implementations of the subject disclosure.

In order to provide additional context for various embodiments described herein, FIG. 16 and the following discussion are intended to provide a brief, general description of a suitable computing environment 1600 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 16, the example environment 1600 for implementing various embodiments of the aspects described herein includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes ROM 1610 and RAM 1612. A basic input/output system (BIOS) can be stored in a non-volatile memory such as ROM, erasable programmable read only memory (EPROM), EEPROM, which BIOS contains the basic routines that help to transfer information between elements within the computer 1602, such as during startup. The RAM 1612 can also include a high-speed RAM such as static RAM for caching data.

The computer 1602 further includes an internal hard disk drive (HDD) 1614 (e.g., EIDE, SATA), and can include one or more external storage devices 1616 (e.g., a magnetic floppy disk drive (FDD) 1616, a memory stick or flash drive reader, a memory card reader, etc.). While the internal HDD 1614 is illustrated as located within the computer 1602, the internal HDD 1614 can also be configured for external use in a suitable chassis (not shown). Additionally, while not shown in environment 1600, a solid state drive (SSD) could be used in addition to, or in place of, an HDD 1614.

Other internal or external storage can include at least one other storage device 1620 with storage media 1622 (e.g., a solid state storage device, a nonvolatile memory device, and/or an optical disk drive that can read or write from removable media such as a CD-ROM disc, a DVD, a BD, etc.). The external storage 1616 can be facilitated by a network virtual machine. The HDD 1614, external storage device(s) 1616 and storage device (e.g., drive) 1620 can be connected to the system bus 1608 by an HDD interface 1624, an external storage interface 1626 and a drive interface 1628, respectively.

The drives and their associated computer-readable storage media provide nonvolatile storage of data, data structures, computer-executable instructions, and so forth. For the computer 1602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. The systems and methods described herein can be implemented utilizing various commercially available operating systems or combinations of operating systems.

Computer 1602 can optionally comprise emulation technologies. For example, a hypervisor (not shown) or other intermediary can emulate a hardware environment for operating system 1630, and the emulated hardware can optionally be different from the hardware illustrated in FIG. 16. In such an embodiment, operating system 1630 can comprise one virtual machine (VM) of multiple VMs hosted at computer 1602. Furthermore, operating system 1630 can provide runtime environments, such as the Java runtime environment or the .NET framework, for applications 1632. Runtime environments are consistent execution environments that allow applications 1632 to run on any operating system that includes the runtime environment. Similarly, operating system 1630 can support containers, and applications 1632 can be in the form of containers, which are lightweight, standalone, executable packages of software that include, e.g., code, runtime, system tools, system libraries and settings for an application.

Further, computer 1602 can be enabled with a security module, such as a trusted processing module (TPM). For instance with a TPM, boot components hash next in time boot components, and wait for a match of results to secured values, before loading a next boot component. This process can take place at any layer in the code execution stack of computer 1602, e.g., applied at the application execution level or at the operating system (OS) kernel level, thereby enabling security at any level of code execution.

A user can enter commands and information into the computer 1602 through one or more wired/wireless input devices, e.g., a keyboard 1638, a touch screen 1640, and a pointing device, such as a mouse 1642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1604 through an input device interface 1644 that can be coupled to the system bus 1608, but can be connected by other interfaces, such as a parallel port, an IEEE 1394 serial port, a game port, a USB port, an IR interface, a BLUETOOTH® interface, etc.

A monitor 1646 or other type of display device can be also connected to the system bus 1608 via an interface, such as a video adapter 1648. In addition to the monitor 1646, a computer typically includes other peripheral output devices (not shown), such as speakers, printers, etc.

The computer 1602 can operate in a networked environment using logical connections via wired and/or wireless communications to one or more remote computers, such as a remote computer(s) 1650. The remote computer(s) 1650 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1652 is illustrated. The logical connections depicted include wired/wireless connectivity to a local area network (LAN) 1654 and/or larger networks, e.g., a wide area network (WAN)

1656. Such LAN and WAN networking environments are commonplace in offices and companies, and facilitate enterprise-wide computer networks, such as intranets, all of which can connect to a global communications network, e.g., the Internet.

When used in a LAN networking environment, the computer 1602 can be connected to the local network 1654 through a wired and/or wireless communication network interface or adapter 1658. The adapter 1658 can facilitate wired or wireless communication to the LAN 1654, which can also include a wireless access point (AP) disposed thereon for communicating with the adapter 1658 in a wireless mode.

When used in a WAN networking environment, the computer 1602 can include a modem 1660 or can be connected to a communications server on the WAN 1656 via other means for establishing communications over the WAN 1656, such as by way of the Internet. The modem 1660, which can be internal or external and a wired or wireless device, can be connected to the system bus 1608 via the input device interface 1644. In a networked environment, program modules depicted relative to the computer 1602 or portions thereof, can be stored in the remote memory/storage device 1652. It will be appreciated that the network connections shown are example and other means of establishing a communications link between the computers can be used.

When used in either a LAN or WAN networking environment, the computer 1602 can access cloud storage systems or other network-based storage systems in addition to, or in place of, external storage devices 1616 as described above. Generally, a connection between the computer 1602 and a cloud storage system can be established over a LAN 1654 or WAN 1656 e.g., by the adapter 1658 or modem 1660, respectively. Upon connecting the computer 1602 to an associated cloud storage system, the external storage interface 1626 can, with the aid of the adapter 1658 and/or modem 1660, manage storage provided by the cloud storage system as it would other types of external storage. For instance, the external storage interface 1626 can be configured to provide access to cloud storage sources as if those sources were physically connected to the computer 1602.

The computer 1602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations.

That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
   a processor; and
   a memory that stores executable instructions that, when executed by the processor, facilitate performance of operations, the operations comprising:
      obtaining structured data corresponding to system information;
      identifying a group of stateful flows from the structured data;
      determining similarity scores for pairs of stateful flows from the group of stateful flows;
      identifying one or more subgroups of stateful flows from the group of stateful flows, wherein the one or more subgroups respectively comprise one or more respective pairs of stateful flows having respective similarity scores satisfying a similarity criterion;
      for each subgroup of the one or more subgroups, combining the stateful flows of the respective pairs of stateful flows of the subgroup into one stateful flow in the group of stateful flows;
      determining, based on a distribution analysis of the one or more subgroups of stateful flows and one or more other stateful flows of the group of stateful flows that are not part of the one or more subgroups, an anomalous stateful flow having a distribution value satisfying an anomalous stateful flow criterion; and
      outputting proactive issue detection information comprising the anomalous stateful flow.

2. The system of claim 1, wherein the structured data comprises text data.

3. The system of claim 1, wherein the structured data comprises component data and service data comprising at least one of: log data, alert data, health check data, or event data.

4. The system of claim 1, wherein the identifying the group of stateful flows comprises:
   identifying two or more stateful flows of the group of stateful flows that comprise incremental data between the two or more stateful flows, and wherein the operations further comprise:
      combining the two or more stateful flows into a single stateful flow in the group of stateful flows.

5. The system of claim 4, wherein the identifying the two or more stateful flows that comprise the incremental data is performed using an output from a two-dimensional convolutional neural network.

6. The system of claim 1, wherein the identifying the group of stateful flows from the structured data comprises extracting parameter data from the structured data to obtain reduced datasets, and wherein the operations further comprise hashing respective reduced datasets to obtain respective hash values, and, for the respective reduced datasets having the respective hash values, combining the reduced datasets having identical hash values into a respective single dataset.

7. The system of claim 1, wherein the proactive issue detection information comprises a distribution, and wherein the anomalous stateful flow corresponds to a low distribution based on a known distribution.

8. The system of claim 1, wherein the determining the similarity scores comprises inputting the respective pairs of stateful flows into a siamese neural network to obtain a respective similarity score for each respective pair of the respective pairs.

9. The system of claim 8, wherein the determining the similarity scores further comprises performing at least one of: a cosine similarity procedure, an edit-based similarity procedure, or a token-based similarity procedure.

10. The system of claim 1, wherein the distribution analysis employs a likelihood ratios for out of distribution detection procedure based on assigning the stateful flows of the group of stateful flows to templates.

11. A method, comprising:
    obtaining, by a system comprising at least one processor, structured messages from a data source;
    identifying, by the system, a group of stateful flows from the structured messages;
    determining, by the system, similarity scores for pairs of stateful flows from the group of stateful flows;
    identifying, by the system, one or more subgroups of stateful flows from the group of stateful flows, wherein the one or more subgroups respectively comprise one or more pairs of stateful flows having similarity scores satisfying a similarity criterion;
    for each subgroup of the one or more subgroups, combining, by the system, the stateful flows of the subgroup into one stateful flow in the group of stateful flows;
    determining, by the system, based on a distribution analysis of the one or more subgroups of stateful flows and one or more other stateful flows of the group of stateful flows that are not part of the one or more subgroups, an anomalous stateful flow having a distribution value satisfying an anomalous stateful flow criterion; and
    outputting, by the system, anomalous stateful flow data comprising the anomalous stateful flow.

12. The method of claim 11, wherein the identifying the group of stateful flows comprises:
    identifying two or more stateful flows of the group of stateful flows that comprise incremental data between the two or more stateful flows, and
    combining the two or more stateful flows into one stateful flow in the group of stateful flows.

13. The method of claim 12, wherein the identifying the two or more stateful flows that comprise the incremental data is performed using a two-dimensional convolutional neural network.

14. The method of claim 11, wherein the outputting the anomalous stateful flow data comprises outputting a distribution of the stateful flows of the one or more subgroups of stateful flows and the one or more other stateful flows.

15. The method of claim 11, wherein the distribution analysis employs a likelihood ratios for out of distribution detection procedure based on assigning the stateful flows of the group of stateful flows to templates.

16. The method of claim 11, further comprising taking action, by the system, to indicate detection of the anomalous stateful flow.

17. A non-transitory machine-readable medium, storing executable instructions that, when executed by a processor, facilitate performance of operations, the operations comprising:

obtaining structured data corresponding to system information;

identifying a group of stateful flows from the structured data;

determining similarity scores for pairs of stateful flows from the group of stateful flows;

identifying one or more subgroups of stateful flows from the group of stateful flows, wherein the one or more subgroups respectively comprise one or more pairs of stateful flows having similarity scores satisfying a similarity criterion;

for each of the one or more subgroups, combining the stateful flows of the subgroup into one stateful flow in the group of stateful flows;

determining, based on a distribution analysis of the one or more subgroups of stateful flows and one or more stateful flows of the group of stateful flows that are not part of the one or more subgroups, an anomalous stateful flow having a distribution value satisfying an anomalous stateful flow criterion; and outputting proactive issue detection information comprising the anomalous stateful flow.

18. The non-transitory machine-readable medium of claim 17, wherein the identifying the group of stateful flows comprises:

identifying two or more stateful flows of the group of stateful flows that comprise incremental data between the two or more stateful flows, and combine the two or more stateful flows into one stateful flow in the group of stateful flows.

19. The non-transitory machine-readable medium of claim 18, wherein the identifying the two or more stateful flows that comprise the incremental data is performed by a two-dimensional convolutional neural network.

20. The non-transitory machine-readable medium of claim 17, wherein the distribution analysis employs a likelihood ratios for out of distribution detection procedure based on assigning the stateful flows of the groups of stateful flows to templates.

* * * * *